US010143039B2

(12) United States Patent
Scherping et al.

(10) Patent No.: US 10,143,039 B2
(45) Date of Patent: Nov. 27, 2018

(54) PROCESSING-PATH-DEPENDENT FILTERING OF DATA PACKETS RECEIVED IN THE CAR2X NETWORK

(71) Applicant: Continental Teves AG & Co. oHG, Frankfurt (DE)

(72) Inventors: Richard Scherping, Liederbach am Taunus (DE); Ulrich Stählin, Eschborn (DE); Marc Menzel, Weimar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 74 days.

(21) Appl. No.: 14/913,811

(22) PCT Filed: Aug. 22, 2014

(86) PCT No.: PCT/EP2014/067941
§ 371 (c)(1),
(2) Date: Feb. 23, 2016

(87) PCT Pub. No.: WO2015/028408
PCT Pub. Date: Mar. 5, 2015

(65) Prior Publication Data
US 2016/0212797 A1    Jul. 21, 2016

(30) Foreign Application Priority Data
Aug. 26, 2013  (DE) ........................ 10 2013 216 947

(51) Int. Cl.
*H04W 84/18* (2009.01)
*G08G 1/09* (2006.01)
(Continued)

(52) U.S. Cl.
CPC ............ *H04W 84/18* (2013.01); *G08G 1/093* (2013.01); *G08G 1/162* (2013.01); *G08G 1/163* (2013.01);
(Continued)

(58) Field of Classification Search
None
See application file for complete search history.

(56) References Cited

U.S. PATENT DOCUMENTS 6,721,537 B1    4/2004  Briesemeister
8,050,188 B2    11/2011 Bai
(Continued)

FOREIGN PATENT DOCUMENTS

DE        19849294      4/2000
DE       102004030994   1/2006
(Continued)

OTHER PUBLICATIONS

German Search Report for German Application No. 10 2014 216 784.1 dated Mar. 24, 2015, including partial translation.
(Continued)

*Primary Examiner* — Chi H Pham
*Assistant Examiner* — Raul Rivas
(74) *Attorney, Agent, or Firm* — RatnerPrestia

(57) ABSTRACT

A method for receiving a data packet containing at least position data in a transmission signal via a vehicular ad hoc network, including: filtering the received data packet on the basis of a first filter condition and outputting the filtered data packet to a processing device for processing the filtered data packet; and filtering the received data packet on the basis of a second filter condition and outputting the filtered data packet to a forwarding device for forwarding the filtered data packet to another subscriber of the vehicular ad hoc network.

11 Claims, 13 Drawing Sheets

(51) Int. Cl.
*G08G 1/16* (2006.01)
*H04W 4/02* (2018.01)
*H04W 4/04* (2009.01)
*H04L 29/08* (2006.01)
*G08G 1/0967* (2006.01)

(52) U.S. Cl.
CPC ............ *H04L 67/327* (2013.01); *H04W 4/02* (2013.01); *H04W 4/046* (2013.01); *G08G 1/09675* (2013.01); *G08G 1/096791* (2013.01); *G08G 1/166* (2013.01)

(56) References Cited

U.S. PATENT DOCUMENTS

| | | | |
|---|---|---|---|
| 8,838,383 | B2 | 9/2014 | Stahlin |
| 8,892,041 | B2 | 11/2014 | Gansen |
| 9,014,921 | B2 | 4/2015 | Bretzigheimer |
| 2007/0002866 | A1 | 1/2007 | Belstner |
| 2009/0122926 | A1* | 5/2009 | Azenkot ............ H04L 27/2647 375/343 |
| 2012/0220231 | A1 | 8/2012 | Stahlin |
| 2013/0083679 | A1 | 4/2013 | Krishnaswamy |

FOREIGN PATENT DOCUMENTS

| | | |
|---|---|---|
| DE | 102006029525 | 1/2007 |
| DE | 102008061303 | 6/2009 |
| DE | 102008015778 | 10/2009 |
| DE | 102010029485 | 12/2010 |
| DE | 112009001557 | 5/2011 |
| DE | 102011080789 | 2/2012 |
| DE | 102011113300 | 6/2012 |
| EP | 2178064 | 4/2010 |
| WO | 2010139526 | 12/2010 |

OTHER PUBLICATIONS

International Search Report for International Application No. PCT/EP2014/067941 dated Jan. 16, 2015.
Written Opinion of the International Searching Authority for International Application No. PCT/EP2014/067941 dated Jan. 16, 2015.

\* cited by examiner

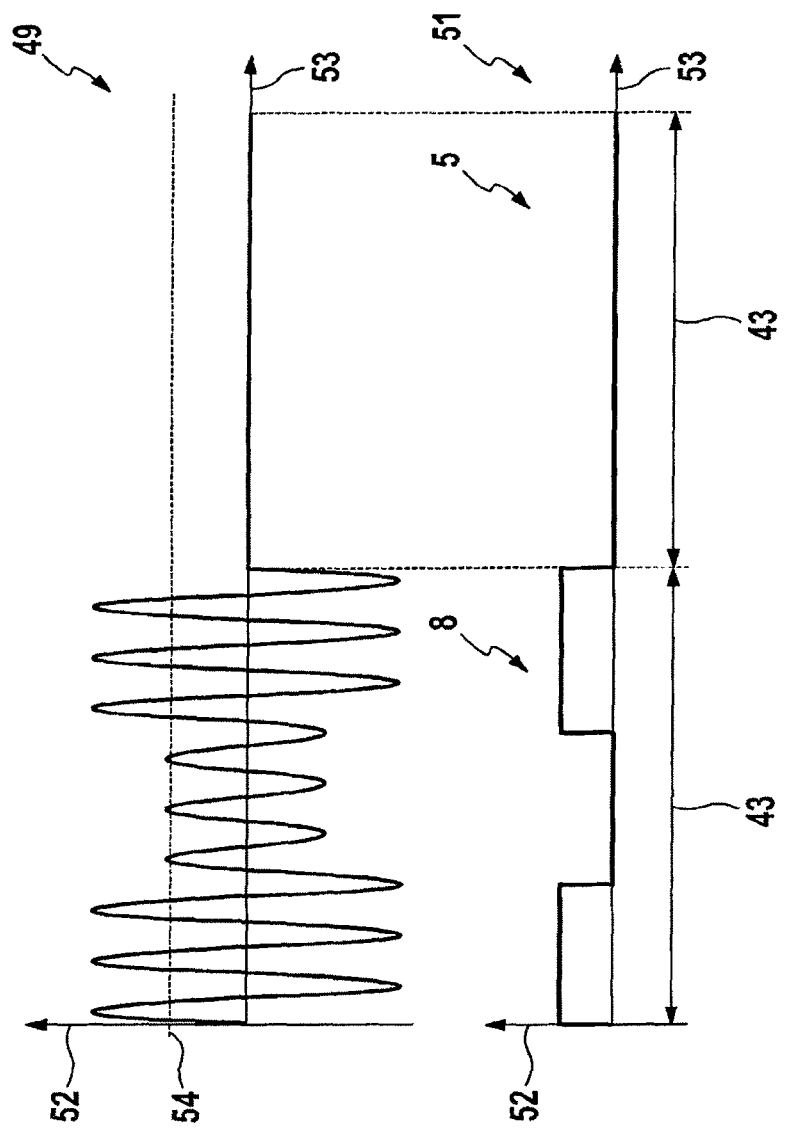

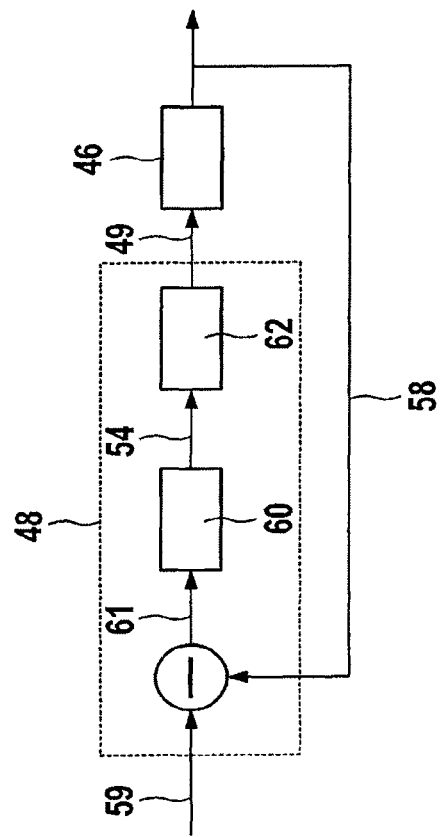
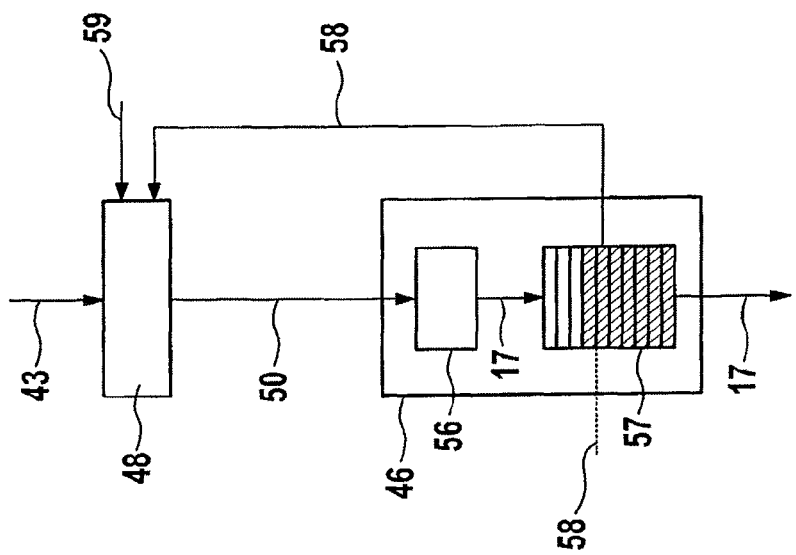
Fig. 7b
Fig. 7a

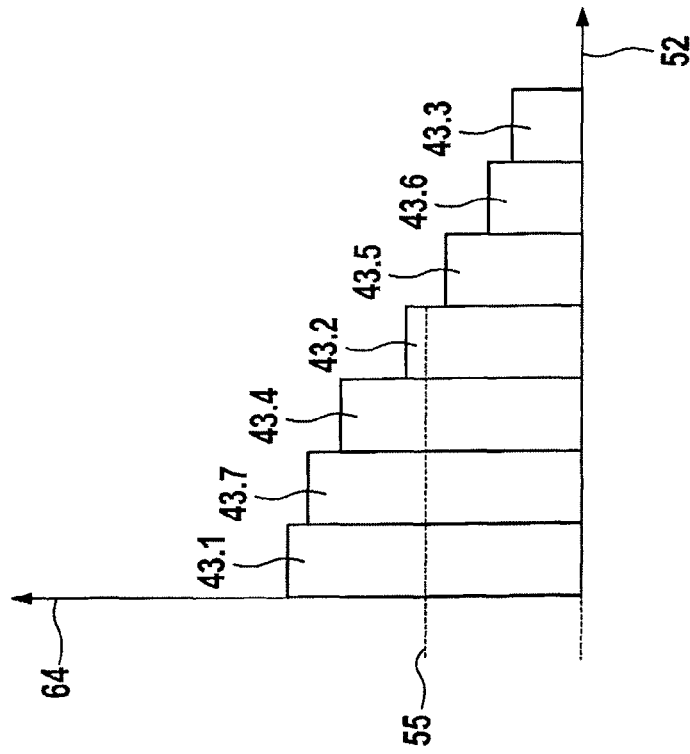
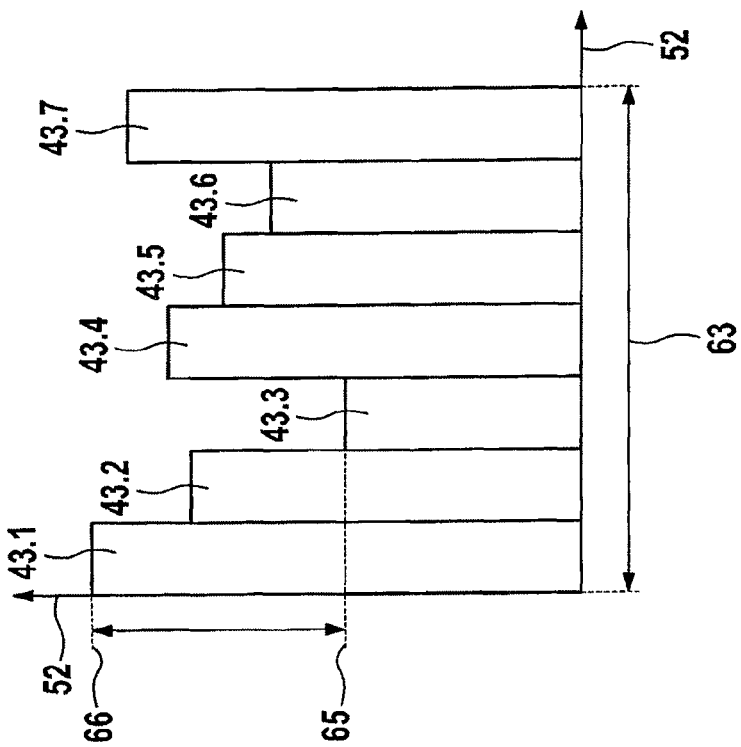

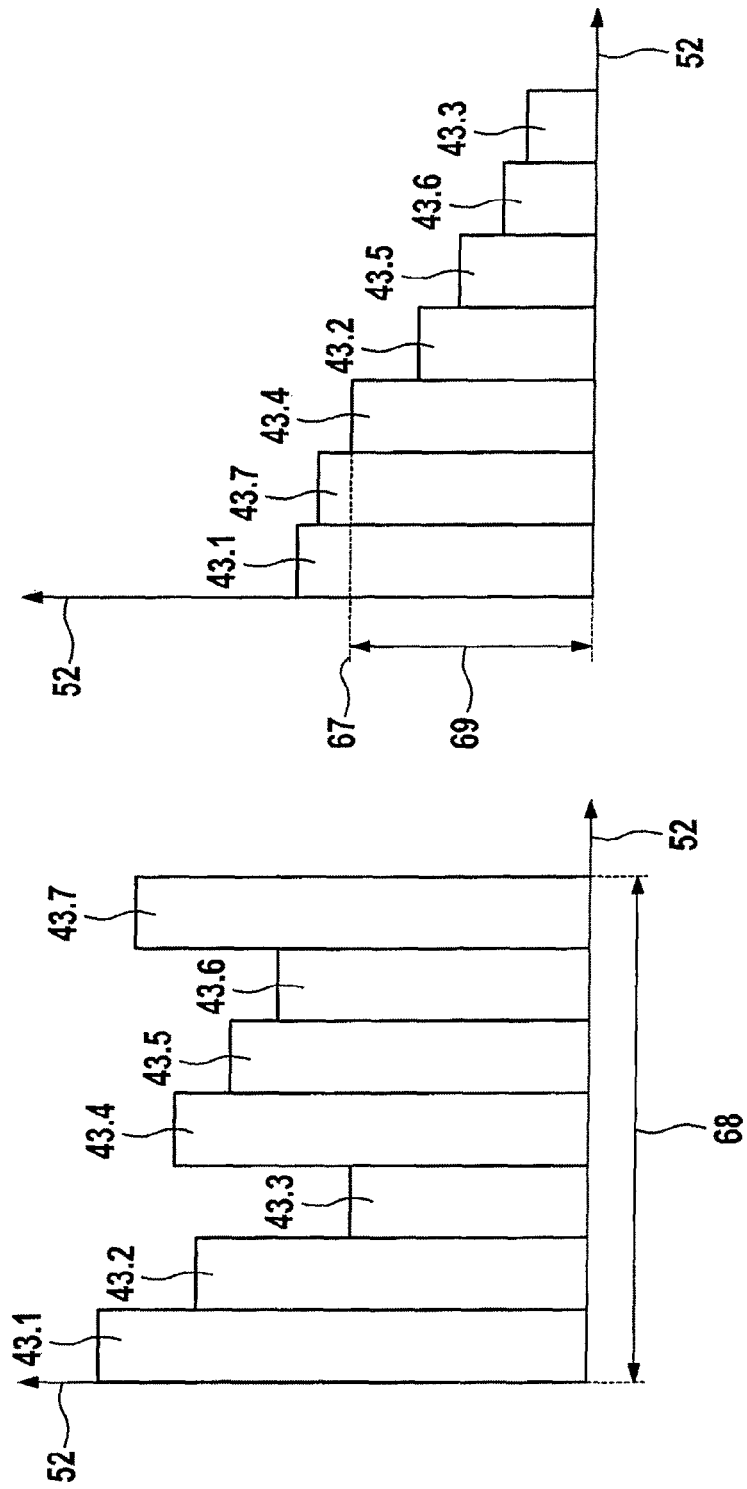

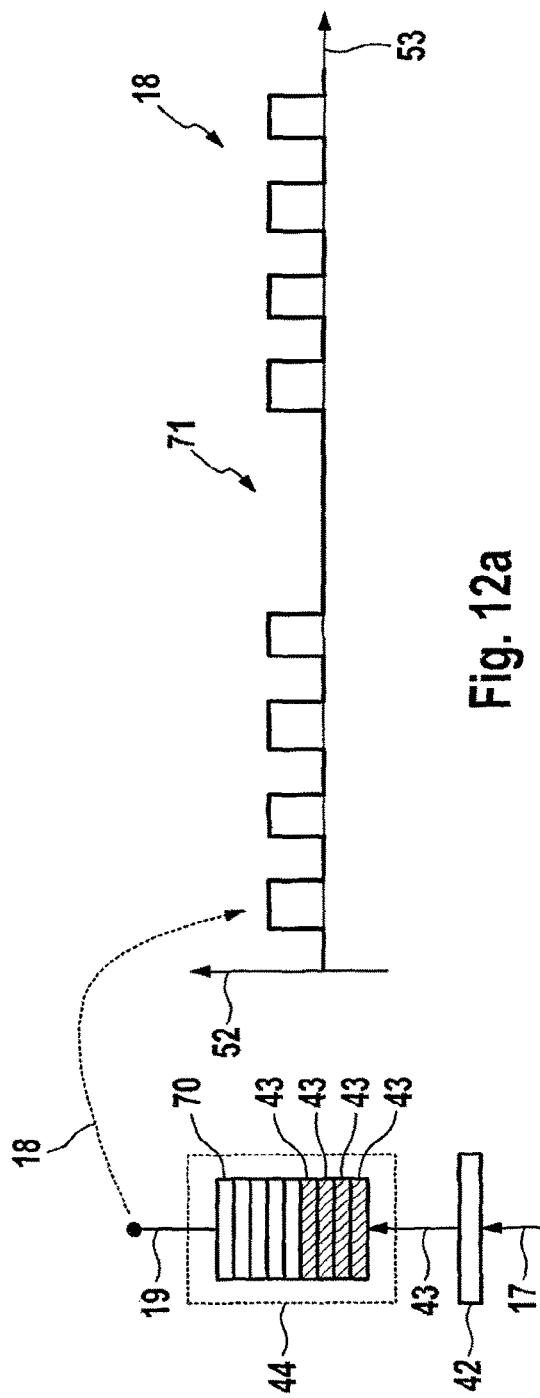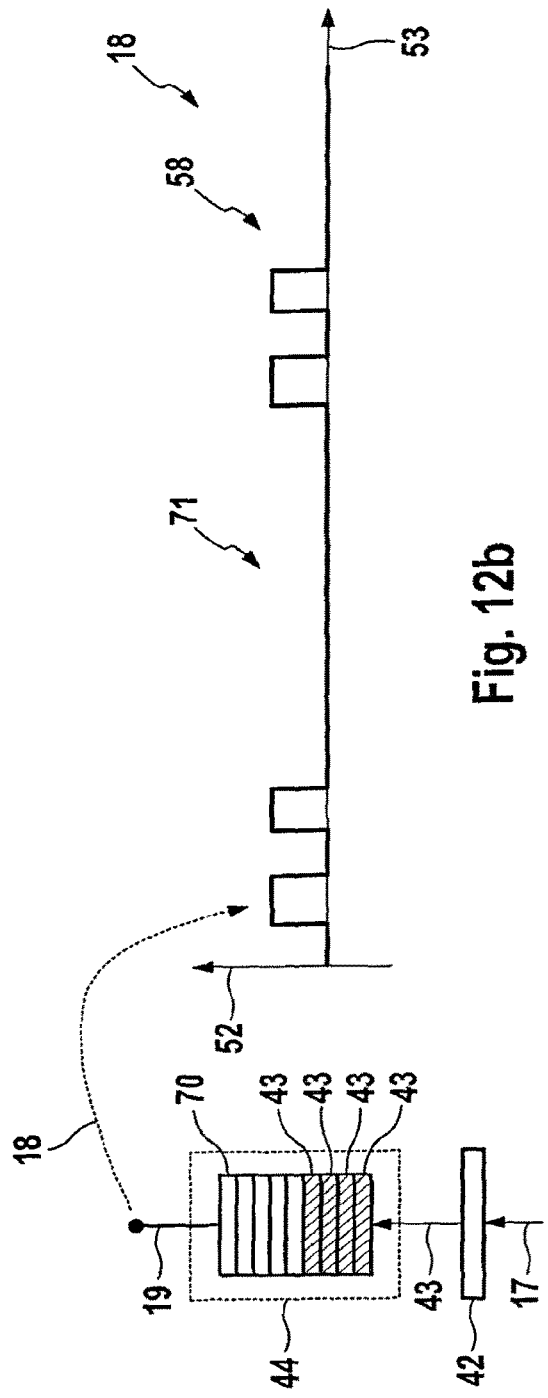

PROCESSING-PATH-DEPENDENT FILTERING OF DATA PACKETS RECEIVED IN THE CAR2X NETWORK

CROSS REFERENCE TO RELATED APPLICATIONS

This application is the U.S. National Phase Application of PCT International Application No. PCT/EP2014/067941, filed Aug. 22, 2014, which claims priority to German Patent Application No. 10 2013 216 947.7, filed Aug. 26, 2013, the contents of such applications being incorporated by reference herein.

FIELD OF THE INVENTION

The invention relates to a method for forwarding a data packet, containing at least position data, that is carried in a transmission signal and received via a vehicle ad hoc network, to a forwarding apparatus for performing the method and to a transceiver having the forwarding apparatus.

BACKGROUND OF THE INVENTION

WO 2010/139 526 A1, which is incorporated by reference, discloses a mobile ad hoc network called car2X whose nodes are particular road users, such as vehicles, or other objects in road traffic, such as traffic lights. These networks can be used to provide the road users involved in the car2X network with advice of road traffic states, such as accidents, congestion, hazard situations, etc.

SUMMARY OF THE INVENTION

An aspect of the invention is to improve the use of such mobile ad hoc networks.

According to one aspect of the invention, a method for receiving a data packet, containing at least position data, in a transmission signal via a vehicle ad hoc network comprises:
 filtering of the received data packet on the basis of a first filter condition and output of the filtered data packet to a processing device for processing the filtered data packet,
 filtering of the received data packet on the basis of a second filter condition and output of the filtered data packet to a forwarding device for forwarding the filtered data packet to a further subscriber of the vehicle ad hoc network.

The specified method is based on the consideration that, depending on the traffic situation, a vehicle ad hoc network can encounter different levels of data load that then need to be processed by the relevant receivers in the vehicles or other nodes involved in the vehicle ad hoc network. Roughly speaking, this involves messages in the vehicle ad hoc network that are to be sent being first of all packed into data packets that are then in turn modulated onto a transmission signal. Accordingly, a receiver of the sent messages first of all needs to filter the data packets out of the transmission signal and then unpack the messages from the filtered data packets. Only then can the messages be used to inform the driver of a vehicle or even to actively control the vehicle. A correspondingly computation-intensive algorithm is also necessary for forwarding, for example in order to make a decision about the forwarding per se on the basis of a surroundings table or the like.

Filtering from the transmission signal and particularly unpacking the messages from the data packets require appropriate computation resources that need to have been dimensioned to be sufficiently powerful for the data load arising in the vehicle ad hoc network, the dimensioning needing to be oriented to the maximum possible channel load in the extreme case. However, the maximum possible channel load is utilised only in particularly extreme situations, such as very high traffic volumes (queue, etc.), in which vehicle ad hoc networks normally also transmit a large number of messages with redundant information or information of no interest. Data packets that contain such messages with redundant information or information of no interest could be eliminated, in principle.

However, a decision about this is likewise associated with a correspondingly high level of computation complexity, because the decision about the information first of all requires the message reporting this information to be unpacked. If the data packets are therefore filtered on the basis of the information filtered with the messages, there can be no particular reduction expected in the computation complexity and hence in the computation resources that need to be kept on hand.

One way of reducing the computation resources would be to decide, prior to the unpacking of a received message, whether or not the received message is relevant, either on the basis of the data packets themselves or even at the level of the transmission signal. This could be performed on the basis of predetermined conditions that simply take the transmission signal and/or the data packet as a basis for allowing an assessment of the extent to which the message packed in the data packet is relevant and whether there is sufficient need (relevance) or even sufficient opportunity (sufficient free channel capacity) to forward the data packet.

Such an approach is already known from object identification using a camera system, which likewise needs to be taken as a basis for making sometimes road-safety-critical decisions. The volume of data from a camera on which object identification is based is so high that the immediate volume of pixel data from the camera cannot be used directly for all necessary object identification operations. Thus, the necessary information from the volume of pixel data is collected in intermediate stages and compressed progressively more. Thus, in a first intermediate stage, object and scene information determined from the volume of pixel data, for example, can be collected, such as whether the lane is to the left and/or right of the vehicle. If an incorrect decision is made in an intermediate stage, however, then this incorrect decision is reflected in all subsequent intermediate stages and results in relevant objects or scenes possibly not being identified as such. Over time, however, the best possible identification of all relevant objects is ensured because a trade-off is always made between computation effort and identification performance.

Based on the insight that the pixels from the camera, like the data packets in the vehicle ad hoc network, are a type of raw data for the processing system in the vehicle, the principle of object identification using a camera system can also be transferred to the transmission of information using the vehicle ad hoc network, with the selection of the relevant messages being performed at the level of the transmission signal and/or the data packets, as already explained. This admittedly no longer ensures that all important data packets are actually forwarded. However, it can be assumed that data packets with relevant messages, such as from a breakdown on the road, are sent more frequently. The constantly changing constraints between two sent data packets with the same message and from the same sender mean that, on statistical average, it can be assumed that the data packets pass through the filter defined by the predetermined condition in timely fashion and thus reach the desired destination in timely fashion. As in the case of the aforementioned object identification using the camera system, the present invention therefore involves the proposal of trading off computation effort and identification performance. This is implemented with the predetermined condition, which is expediently altered over time, in order to trade off computation effort and identification performance.

An assessment of a received message only by considering the data packet in which it is packed and/or the transmission signal carrying it would admittedly save a considerable volume of computation resources if the received message can be classified as irrelevant and hence eliminated. For the purposes of the specified method, however, it is recognised that a final assessment about the received message is also dependent on the further purpose for which the received messages are used. In principle, it can be stated that the predetermined condition for a message that is to be forwarded to other nodes in the vehicle ad hoc network and that is received in a data packet with a transmission signal should be chosen differently than for a received message that is intended for a vehicle-internal application. An example that may be cited in this case is assessment on the basis of the signal strength of the transmission signal, since, while only transmission signals with low signal strengths should be taken into account, as far as possible, for a message that is to be forwarded, because a significant range increase cannot be attained for transmission signals with high signal strengths by senders that are far too close, only received messages in transmission signals having the highest signal strength possible should, to the contrary, be taken into account for a message that is to be used internally in a vehicle, because the information from senders that are far too remote can per se be classified as irrelevant.

This is the point at which the specified method takes effect with the proposal to use two different filter paths for filtering a transmission signal and the data packet carried therein. While a decision about forwarding can be made on a first signal path, a decision about vehicle-internal further processing can be made on the second filter path. The two signal paths can then be matched to the different handling complexity that is necessary in order to continue to use the not yet demodulated transmission signal and/or the not yet unpacked data packets as intended, so that ultimately four different processing states are possible:
1. a received message is completely rejected prior to the actual unpacking,
2. a received message is only forwarded, but not processed internally in the receiver,
3. a received message is only processed internally in the receiver, but not forwarded, or
4. a received message is completely unpacked in the conventional manner and passes through the complete processing path.

The separation during the filtering of a received message, but one that is at least still packed in a data packet and optionally still carried on a transmission signal, between messages that are to be forwarded and messages that are to be processed internally in the receiver allows savings to be achieved in the computation complexity particularly in high-load situations on the car2X network as a result of the different computation complexity for handling the received message on the two signal paths.

In one development of the specified method, the filtering on the basis of the first filter condition and the filtering on the basis of the second filter condition are performed independently of one another.

In another development of the specified method, the first filter condition comprises a minimum signal strength for a signal strength of the transmission signal. In this case, the filtering of the received data packet can comprise rejection of the received data packet if the signal strength of the received data packet falls below the minimum signal strength.

In a special development of the specified method, the first filter condition is dependent on operation of the processing device. In this case, the filtering of the received data packet can comprise rejection of the received data packet if a message packed in the data packet is irrelevant to the operation of the processing device.

In yet another development of the specified method, the second filter condition comprises a maximum field strength for a signal strength of the transmission signal. In this case, the filtering of the received data packet can comprise rejection of the received data packet if the signal strength of the received data packet is above the maximum field strength.

According to a further aspect of the invention, an apparatus is set up to perform a specified method.

In one development of the specified apparatus, the specified apparatus has a memory and a processor.

In this case, the specified method is stored in the memory in the form of a computer program, and the processor is provided for carrying out the method when the computer program is loaded into the processor from the memory.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

According to a further aspect of the invention, a transceiver for a vehicle for receiving data packets, which are sent in a transmission signal, in a vehicle ad hoc network comprises an antenna for receiving the transmission signal and one of the specified apparatuses for performing one of the specified methods.

According to another aspect of the invention, a vehicle comprises one of the specified transceivers.

A further aspect of the invention, which relates to a method for reducing the computation load on a vehicle-to-X communication system is discussed below.

The prior art discloses what are known as vehicle-to-X communication systems that are used for transmitting both traffic-related data and various service data, such as entertainment applications. In this case, the vehicle-to-X communication is based both on the data interchange between vehicles themselves (vehicle-to-vehicle communication) and on the data interchange between vehicles and infrastructure devices (vehicle-to-infrastructure communication). On account of the high demands on the reliability and data integrity of information transmitted by means of vehicle-to-X communication, such information is additionally often provided with an elaborate security signature or data encryption.

The evaluation of such a security signature and the decoding of such data encryption are associated with a relatively high level of computation effort, however. Added to this is the occurrence of special situations, such as passage through a busy urban junction at rush hour, in which a number of vehicle-to-X messages is received that is such that processing of all vehicle-to-X messages received is likewise possible only through the provision of a comparatively high level of computation power. In order to keep the computation complexity and hence the purchase costs for a computation module for such a vehicle-to-X communication system as low as possible, the prior art additionally discloses various preprocessing methods that make a selection for the vehicle-to-X messages that are to be decoded from among all received vehicle-to-X messages. However, the known preprocessing methods are limited to making the further processing of received vehicle-to-X messages essentially solely dependent on a general classification that primarily follows the requirements of application systems that are present in the receiver vehicle.

Therefore a further aspect of the invention proposes a more flexible and more situation-matched preprocessing method for the vehicle-to-X communication.

In this case, the further aspect of the invention takes into account that three steps in the sequence of the processing of a received vehicle-to-X message require the proportionally largest share of computation time. These are:
  checking the data integrity signature,
  georouting, that is to say the message-dependent forwarding or re-sending of a received vehicle-to-X message,
  further processing of the received vehicle-to-X messages in the communication-based applications.

Particularly in the case of the so-called DENM messages, in which there is provision for georouting, the prior art always requires a compromise between the requirements of the georouting and the requirements of the dedicated communication-based applications of the vehicle.

According to an aspect of the invention, there is therefore provision for preprocessing or filtering to involve selection from three prescribed decision options:
  immediate rejection without any type of further processing,
  no georouting (but forwarding to the dedicated communication-based applications of the vehicle) and
  only georouting (but no forwarding to the dedicated communication-based applications of the vehicle).

If a data packet or a vehicle-to-X message is flagged or identified as relevant, it is preferably processed completely, i.e. none of the aforementioned three prescribed decision options are implemented.

When the reception field strength of the vehicle-to-X message is high, provision is preferably made for no georouting to take place, since the sender is comparatively close. There would therefore be hardly any increase in the area of circulation of the vehicle-to-X message anyway.

When the reception field strength of the vehicle-to-X message is low, the receiver of said message additionally not being situated in the destination area of the vehicle-to-X message, provision is preferably made for only georouting to be performed in order to transmit the vehicle-to-X message to the destination area, the dedicated system not requiring the information from the vehicle-to-X message.

In addition, it is preferred for only georouting to be performed when the type of the vehicle-to-X message corresponds to a type that is evaluated by none of the communication-based applications of the vehicle.

In addition, it is preferred for a vehicle-to-X message to be immediately rejected when the type of the vehicle-to-X message corresponds to a type that is evaluated by none of the communication-based applications of the vehicle and the reception field strength is very high.

The processes "No georouting" and "Only georouting" can preferably be implemented using what are known as flags in the received vehicle-to-X message or else using separate "task communication channels".

The further aspect of the invention therefore results in the advantage that the different requirements of the georouting and of the dedicated communication-based applications of the vehicle can be used efficiently for preprocessing. This avoids unnecessary computation complexity both for the georouting and for the evaluation and processing by the dedicated communication-based applications of the vehicle.

BRIEF DESCRIPTION OF THE DRAWINGS

The properties, features and advantages of this invention that are described above and also the manner in which they are achieved will become clearer and more distinctly comprehensible in connection with the description of the exemplary embodiments that follows, said exemplary embodiments being explained in more detail in connection with the drawings, in which:

FIG. 6 shows a basic illustration of filtered signals that have been received from the vehicle ad hoc network from FIG. 3, FIGS. 7a and 7b show a basic illustration of a reception filter for filtering the signal from FIG. 4, FIGS. 8a and 8b show a basic illustration of data packets that have been filtered from a signal received via the vehicle ad hoc network from FIG. 3.

DETAILED DESCRIPTION OF THE PREFERRED EMBODIMENTS

In the figures, like technical elements are provided with like reference symbols and described only once.

Figure 3:
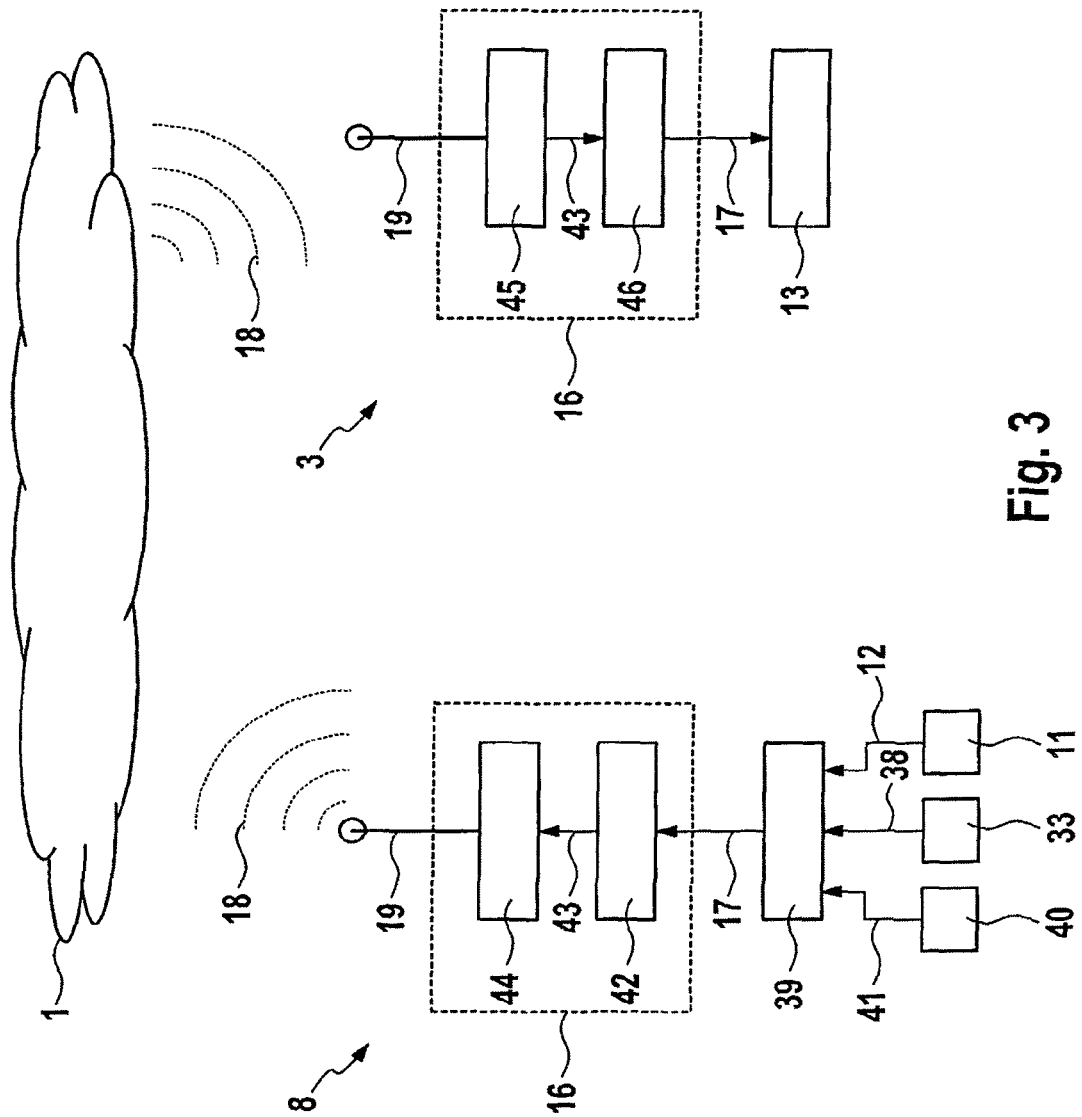
FIG. 3 shows a basic illustration of a vehicle ad hoc network in which the vehicle from FIGS. 1 and 2 can be involved.

An aspect of the invention relates to a network protocol for a vehicle ad hoc network shown in FIG. 3, which is called car2X network 1 below for the sake of simplicity. To provide a better understanding of the technical background to this car2X network 1, a nonrestrictive exemplary application will first of all be provided for this car2X network 1 before discussing technical details pertaining thereto in more detail.

Figure 1:
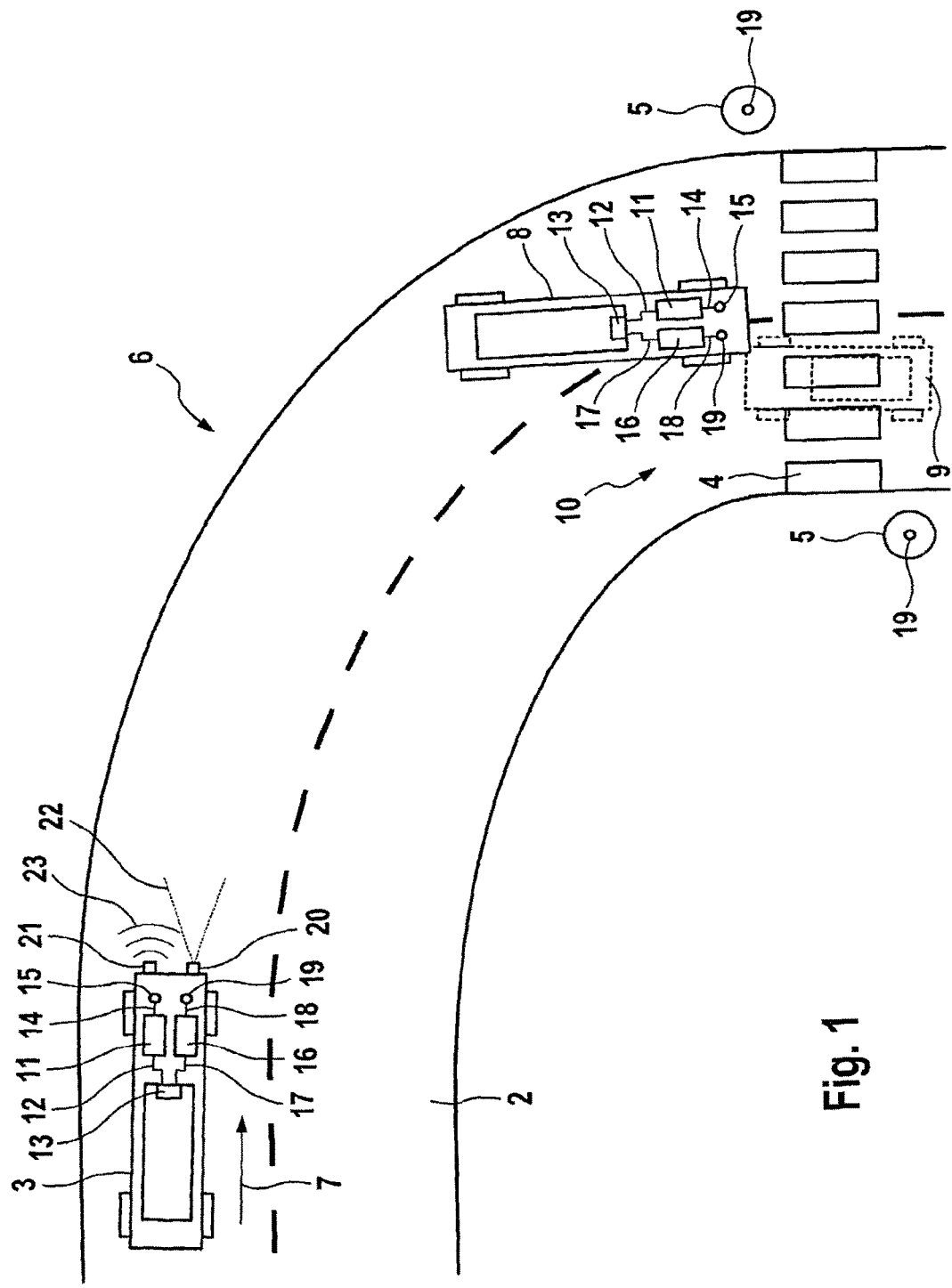
FIG. 1 shows a basic illustration of a vehicle travelling on a road.

Therefore, reference is made to FIG. 1, which shows a basic illustration of a vehicle 3 travelling on a road 2.

In the present embodiment, the road 2 is meant to have a pedestrian crossing 4 at which a set of traffic lights 5 is used to regulate whether the vehicle 4 on the road 2 is permitted to cross the pedestrian crossing 4 or a pedestrian—not shown in more detail—on the pedestrian crossing 4 is permitted to cross the road 2. Between the pedestrian crossing 4 and the set of traffic lights 5, there is, for the purposes of the present embodiment, an obstacle in the form of a curve 6 that conceals the pedestrian crossing 4 from the driver of the vehicle 3 and from an ambient sensor system—which is yet to be described—of the vehicle 3.

In a direction of travel 7 ahead of the vehicle 3, FIG. 1 shows a further vehicle 8 that has been involved in a road accident 10 with a vehicle 9—shown in dots—on the pedestrian crossing 4 and is blocking the lane in the direction of travel 7 of the vehicle 3.

The pedestrian crossing 4 and the road accident 10 are hazard situations on the road 2. If the driver of the vehicle 3 overlooks the pedestrian crossing 4 and therefore illegally fails to stop before it, he could hit a pedestrian who is crossing the pedestrian crossing 4 and who, in crossing the pedestrian crossing 4, relies on the driver of the vehicle 3 behaving in accordance with the rules. In both hazard situations, the driver of the vehicle 3 must stop the vehicle 3 in order to avoid a collision with the hazard object in the hazard situation, that is to say the pedestrian and/or the further vehicle 8. To this end, the car2X network 1 can be used, which will be discussed in more detail at a later juncture.

In the present embodiment, the vehicle 3 has a receiver 11 for a global satellite navigation system, called a GNSS receiver 11 below, which the vehicle 3 can use in a manner known per se to determine position data in the form of its absolute geographical position 12 and to use said position data for the purposes of a navigation system 13, for example, in order to display them on a geographical map, which is not shown further. Corresponding signals 14 from the global satellite navigation system, called GNSS signals 14 below, can be received via an appropriate GNSS antenna 15, for example, and forwarded to the GNSS receiver 11 in a manner known per se.

In the present embodiment, the vehicle additionally has a transceiver 16 that the vehicle 3 can use to be involved as a node in the car2X network 1 and to interchange messages, called car2X messages 17 below, with other nodes, such as the further vehicle 8 and/or the set of traffic lights 5. In order to distinguish it from the GNSS receiver 11, this transceiver 16 will be called car2X transceiver 16 below.

In the car2X messages 17 interchanged via the car2X network 1, the individual nodes 3, 5, 8 can interchange data describing various information with one another, which data can be used to increase road safety on the road 2, for example. An example of the information that can be interchanged with the data in the car2X messages 17 would be the absolute geographical position 12, determined using the GNSS receiver 11, of the respective node 3, 5, 8 of the car2X network 1. Such data can also be called position data. If the node 3, 5, 8 of the car2X network 1 that receives the geographical position 12 is a vehicle, such as the vehicle 3 that is not involved in the road accident 10 and the vehicle 8 that is involved in the road accident 10, then the geographical position 12 received via the car2X network 1 can be used to represent the traffic movement, for example, on the navigation system 13 of the receiving vehicle 3, 8, for example. If, besides the absolute geographical position 12, the road accident 10 is also described as information with the data in the car2X message 17, then determined traffic situations, such as the road accident 10, can be represented on the navigation system 13 more specifically. Further possible information that can be interchanged with the car2X messages 17 will be discussed in more detail later for the purposes of FIG. 2.

Figure 2:
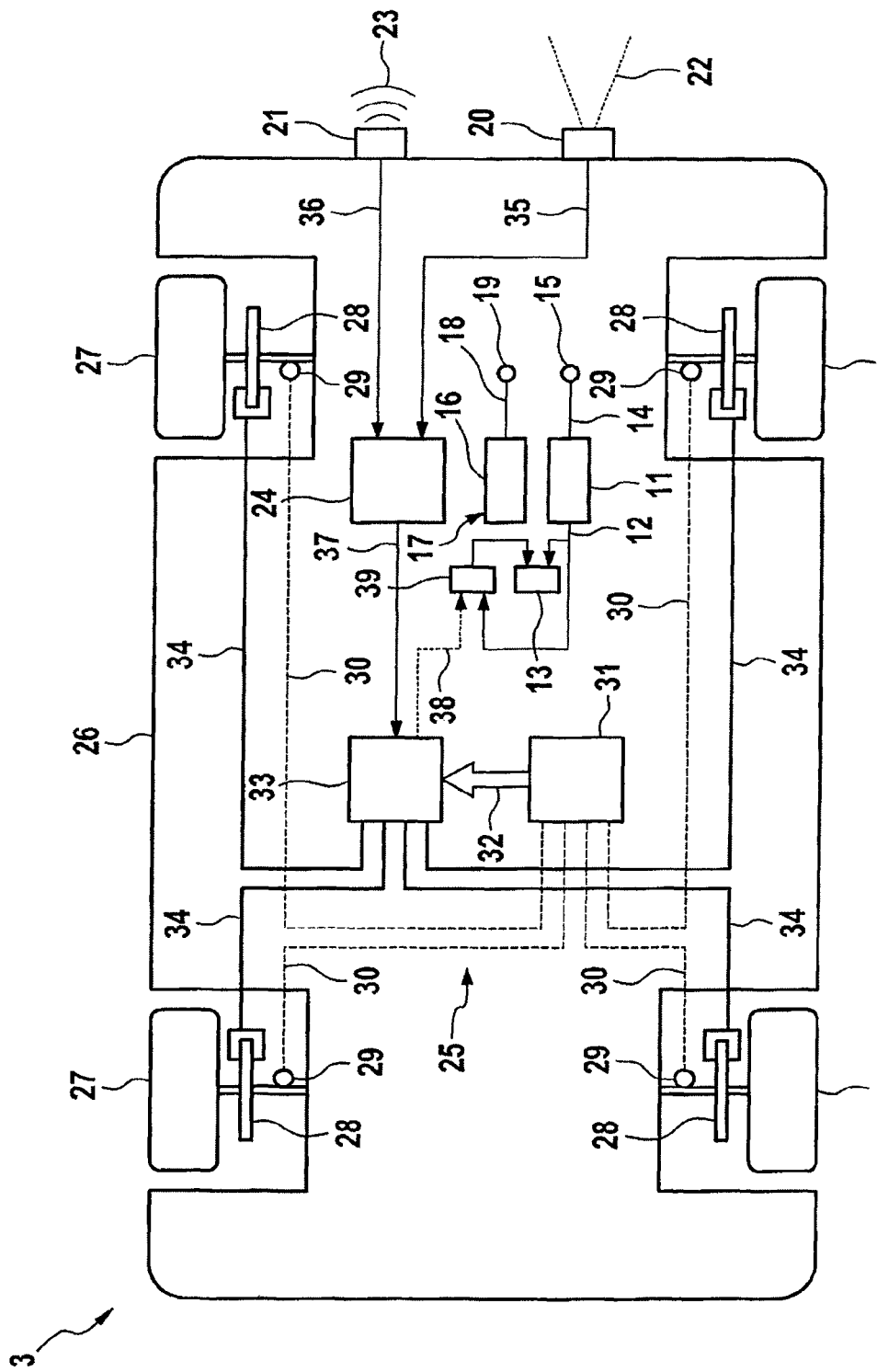
FIG. 2 shows a basic illustration of the vehicle from FIG. 1.

In order to interchange the car2X messages 17, the car2X transceiver 16 either modulates a car2X message 17 onto a transmission signal, called car2X signal 18 below, and sends it via an antenna, called car2X antenna 19 below, to the other nodes 3, 5, 8 in the car2X network 1, or it uses the car2X antenna 19 to receive a car2X signal 18 and filters the relevant car2X message 17 therefrom. This will be discussed in more detail at a later juncture for the purposes of FIG. 3. In this case, FIG. 1 shows that the car2X transceiver 16 outputs a car2X message 17 to the navigation system 13 on the assumption that said message contains, in the manner described above, information that can be represented on said navigation system. This is not intended to be understood as a restriction, however. In particular, it is expediently also possible for the GNSS receiver 11 to be connected to the car2X transceiver 16 directly or, as shown in FIG. 2, indirectly in order to send its own absolute geographical position 12 in the car2X network 1.

The structure of the car2X message 17 and of the car2X signal 18 and hence the design of the car2X network can be defined in a communication protocol. There are already such communication protocols on a country-specific basis, inter alia for the purposes of ETSI TC ITS at ETSI in Europe and for the purposes of IEEE 1609 at IEEE and also at SAE in the United States of America. Further information in this regard can be found in the cited specifications.

The vehicle 3 can optionally also have the aforementioned ambient sensor system in the form of a camera 20 and a radar sensor 21. The camera 20 can be used by the vehicle 3 to record an image of a view that is ahead of the vehicle 3, when considered in the direction of travel 7 of the vehicle 3, within an image angle 22. In addition, the vehicle 3 can use the radar sensor 21 and appropriate radar beams 23 to identify objects, when considered in the direction of travel 7 of the vehicle 3, and to determine the distance from the vehicle 3 in a manner known per se.

In order to substantiate the information that can be transmitted with a car2x message 17, the design of the vehicle 3 and of the further vehicle 5 will first of all be discussed below on the basis of the vehicle 3 by way of example. The vehicle 3 has various safety components, of which FIG. 2 shows an electronic braking assistant 24, called EBA 24, and a driving dynamics control system 25, which is known per se. While DE 10 2004 030 994 A1 provides details pertaining to the EBA 24, DE 10 2011 080 789 A1 provides details pertaining to the driving dynamics control system 25.

The vehicle 3 comprises a chassis 26 and four wheels 27. Each wheel 27 can be slowed down in comparison with the chassis 26 by means of a brake 28, mounted at a fixed location on the chassis 26, in order to slow down a movement by the vehicle 3 on the road 2.

In this case, in a manner that is known to a person skilled in the art, it may occur that the wheels 27 of the vehicle 3 lose their traction and the vehicle 3 even moves away from a trajectory, for example prescribed by means of a steering wheel, which is not shown further, as a result of understeer or oversteer. This is avoided by the driving dynamics control system 25.

In the present embodiment, the vehicle 4 has speed sensors 29 on the wheels 27 for this purpose, which sense a speed 30 of the wheels 27.

On the basis of the sensed speeds 30, a controller 31 can determine, in a manner that is known to a person skilled in the art, whether the vehicle 3 slips on the carriageway or even deviates from the aforementioned prescribed trajectory, and can react thereto accordingly with a control output signal 32 that is known per se. The controller output signal 32 can then be used by an actuating device 33 in order to use actuating signals 34 to actuate actuating elements, such as the brakes 28, which react to the slipping and the deviation from the prescribed trajectory in a manner that is known per se.

The EBA 24 can evaluate image data 35, captured using the camera 20, and distance data 36, captured using the radar sensor 21, pertaining to objects such as vehicles in the direction of travel 7 ahead of the vehicle 3 and, on the basis thereof, can detect a hazard situation. This hazard situation could arise, by way of example, when an object ahead of the vehicle 3 approaches the latter at an excessive speed. In such a case, the EBA 24 could use an emergency braking signal 37 to instruct the actuating device 33 to use the actuating signals 34 to carry out emergency braking with the brakes 28.

Each time the EBA 24 or the driving dynamics control system 25 uses the actuating device 33 to take action in the vehicle 4, the actuating device 33 can output a report signal 38, for example, which is shown in dots in FIG. 2. Expediently, the report signal 38 should substantiate whether the action was required by the EBA 24 or the driving dynamics control system 25. Such a report signal 38 can be produced by any entity in the vehicle 3, that is to say even by the controller 31 of the driving dynamics control system 25, for example. A message generation device 39 could then take the report signal 38, the absolute geographical position 12 and a timestamp 41, which is shown in FIG. 3 and output from a timer 40, as a basis for generating a car2X message 17 that can be used to report the action of the EBA 24 and/or of the driving dynamics control system 25 to the other nodes 5, 8 as information via the car2X network 1. The car2X message 17 generated in this manner could then be sent in the car2X network 1 via the car2X antenna 19.

In the example of FIG. 1, it was explained that the information about the absolute geographical position 12 of the individual nodes 3, 5, 8 and/or about events such as the road accident 10 and/or such as an action by the EBA 24 and/or the driving dynamics control system 25 that is interchanged in the car2X messages 17 could be represented on the navigation system 13 for the purpose of orienting the driver. Alternatively or additionally, the information interchanged in the car2X messages 17 can also be taken as a basis for actively generating actuating signals 34, for example using the actuating device 33, however. If, by way of example, the action by the EBA 24 is transmitted as information in a car2x message 17, then it would be possible, by way of example, to take the reception of this car2x message 17 as a basis for automatically triggering the EBA 24 in the receiving vehicle 3, 8.

The transmission of a car2X message 17 via the car2X network 1 will be explained below with reference to FIG. 3, said car2X network being indicated by a cloud in FIG. 3 for the sake of clarity. The content of the car2x message 17 will be assumed to be, by way of example, an action—reported by the actuating device 33 with the report signal 38—by the EBA 24 in the accident vehicle 8 involved in the road accident 10.

As already explained, the message generation device 39 takes the report signal 38, the absolute geographical position 12 and the timestamp 41 as a basis for generating the car2x message 17 according to the aforementioned communication protocol. In this case, the message generation device 39 may also be part of the car2x transceiver 16, in principle.

From the car2x message 17, data packets 43 are generated in a data packet generation device 42 in the car2x transceiver 16 of the accident vehicle 8. The generation of data packets 43 means that car2X messages 17 from various applications in the accident vehicle 8 can be combined to form a single data stream in order to produce the car2X signal 18. The data packet generation device 42 is based on a network and transport layer, the task of which is known to be to route the network data from various applications. When a received data packet 43 is forwarded to further subscribers 3, 5, 8 in the car2X network 1, the message generation device 39 and the data packet generation device 42 jointly represent the network and transport layer, which, however, is essentially dependent on the aforementioned specification of the communication protocol for the car2X network 1.

The generated data packets 43 are modulated onto the car2X signal 18 in a modulation device 44 and wirelessly sent in the car2X network 1. The modulation device 44 therefore corresponds to an interface layer, the task of which is to physically connect the accident vehicle 8 to the car2X network 1. The design of the modulation device 44 is also dependent on the aforementioned specification of the communication protocol for the car2X network 1.

In the vehicle 3 that is not involved in the road accident 10, the car2X signal 18 sent by the accident vehicle 8 can then be received via the car2X antenna 19.

In order to extract the car2X message 17 from the car2X signal 18, the car2X transceiver 16 of the vehicle 3 has a demodulation device 45 that reverses the sender-end modulation of the data packets 43 in a manner that is known per se. Accordingly, a message extraction device 46 can extract the car2X messages 17 from the data packets 43 and make them available to the applications in the vehicle 3, such as the navigation system 13 or even the actuating device 33. Ultimately, the demodulation device 45 and the message extraction device 46 are the reception-end counterparts in accordance with the aforementioned network and transport layer and the interface layer and are likewise dependent on the aforementioned specification of the communication protocol for the car2X network 1.

For details of the individual network layers, reference is therefore made to the relevant specifications.

Particularly in high-load situations when there are a multiplicity of nodes 3, 5, 8 in the car2X network 1 on the road 2, it is necessary for correspondingly high levels of computation resources to be kept free in the respective nodes 3, 5, 8 for the purpose of processing all car2X messages 17 sent in the car2X network 1, in order to guarantee the processing of all car2X messages 17 at the receiver end within particular time limits. The provision of these high levels of computation resources is associated with a correspondingly high outlay in terms of cost, which is intended to be reduced for the purposes of the present embodiment by the introduction of initial filters 47, 48.

If, by way of example, the vehicle 3 that is not involved in the road accident 10 receives a car2X message 17 providing information about this road accident 10, then the vehicle 3 that is not involved in the road accident 10 could provide the relevant data packet 43 having this car2X message 17 with a timestamp 41 of its own and with its geographical position 12 and forward it, as a car2X message 17' that is to be forwarded, to other nodes 5, 8 in the car2X network 1. The decision about forwarding can be made in the message generation device 39, for example, which then has to unpack the message 17, which potentially needs to be forwarded, in the data packet 43 at least in part.

Although the actual decision-making in the message generation device 39 will not be discussed in more detail, what is intended to become clear is that the decision regarding whether a car2X message 17 received in a car2X signal 18 and packed in a data packet 43 is intended to be forwarded is taken fundamentally on the basis of the information in the car2X message 17, which is why each car2X message 17 ought to be extracted from the car2X signal 18 for the purposes of this scheme.

The response is the same with car2X messages 17 that are intended to be processed further internally in the vehicle 3 that is not involved in the accident as a receiving node in the car2X network 1, for example in order to represent the road accident 10 on the navigation system 13. In this case too, the car2X message 17 ought to have its content analysed in order fundamentally to take the decision regarding whether the information reported with the car2X message 17, that is to say the road accident 10, for example, is relevant and hence needs to be processed further.

Figure 4:
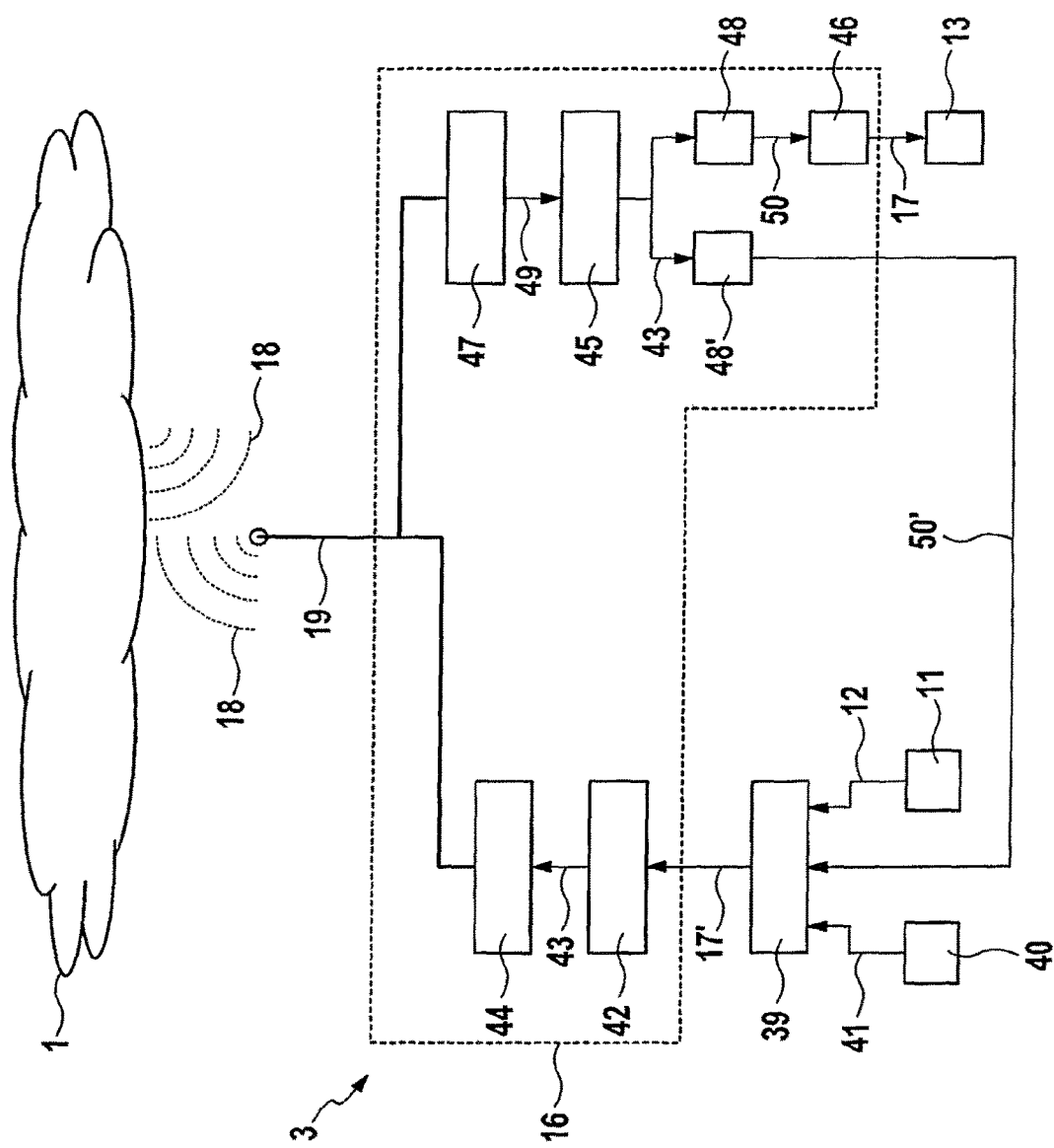
FIG. 4 shows a basic illustration of a transceiver in the vehicle ad hoc network 1 from FIG. 3.

This is the point at which the present embodiment with initial filters 47, 48, 48' shown in FIG. 4 takes effect. Whereas the first initial filter 47 outputs a filtered car2X signal 49, in which some of the data packets 43 and hence some of the car2X messages 17 can be filtered out without their each being unpacked, the second initial filter 48 outputs filtered data packets 50, from which some of the data packets 43 originally sent in the car2X signal 18 can likewise be filtered out without the car2X messages 17 packed therein each being unpacked, to the message generation device 46. Hence, the navigation system 13 and if need be the message generation device 46 just need to decide about some of the car2X messages 17 originally contained in the car2X signal 18, so that the other, filtered-out car2X messages 17 no longer need to be decrypted. In the same way, the third initial filter 48' likewise filters some of the data packets 43 from the filtered car2X signal 18 and outputs the data packets 50' accordingly filtered using the third initial filter 48' to the message generation device 39, which can then continue to decide about the forwarding of the filtered data packet 50' on the basis of content in the manner described previously.

The concept behind the initial filters 47, 48, 48' is fundamentally for potentially irrelevant car2X messages 17 to be eliminated as early as possible in order to avoid their needing to be processed unnecessarily by an element in the processing chain because they are irrelevant or redundant either as a forwarded message 17' and/or as a message 17 that needs to be processed internally. This allows a significant reduction in the computation complexity for the fundamentally necessary decision about further processing of a car2X message 17 received in the car2X signal 18.

Whereas the first initial filter 47 could in this case filter the car2X signal 18 without knowledge of the actual car2X message 17, the second and third initial filters 48, 48' could filter the data packets 43 without knowledge of the actual car2X message 17. Admittedly, this no longer ensures that, of the car2X messages 17 sent in the vehicle ad hoc network 1, all safety-critical car2X messages 17, such as a report about action by the EBA 24, also actually arrive at all destination nodes 5, 8 in the car2X network 1 and are processed further in the receiving node 3. Normally, however, such safety-critical car2X messages 17 are not sent only once, which means that, on statistical average, it can be assumed that such safety-critical car2X messages 17 pass through the initial filters 47, 48, 48' in at least one forwarding node in the car2X network 1 within a feasible timeframe. In order to keep this feasible timeframe as short as possible, initial filters 47, 48, 48' can be designed such that safety-critical data pass through the initial filters 47, 48, 48' with above-average probability.

For the most efficient initial filtering possible in the initial filters 47, 48, 48', a predetermined filter condition should be introduced, according to which the car2X signal 18 is initially filtered in the first initial filter 47 and/or the data packets 43 are initially filtered in the second and third initial filters 48, 48'. The concept behind the present embodiment is for the predetermined filter condition for decision about forwarding of a received data packet 43 to other nodes 5, 8 of the car2X network 1 to be separated from the predetermined filter condition for the decision about the further internal processing in the receiver node 3 and for both filtering operations to be handled independently. This is implemented in FIG. 4 with the second and third initial filters 48, 48', which are in parallel with one another and hence separate a processing path for the data packets 43 that are to be forwarded from a processing path for the data packets 43 that are to be processed internally in the receiver node 3. In principle, the two processing paths can be separated at any point, that is to say actually upstream of the first filter 47 or internally in the first filter 47 at any point. It is also possible for the second and third filters 48, 48' to be in joint form in part. The separation of the two processing paths upstream of the second and third filters 48, 48' is therefore purely exemplary.

In the first initial filter 47 in one of the two processing paths, the received car2X signal 18 can be filtered, by way of example, on the basis of a predetermined signal strength as a predetermined filter condition, with the received car2X signal 18 having a signal strength lower than the predetermined signal strength being suppressed. All senders of the car2X signal 18 outside a receiver radius that is dependent on the predetermined signal strength would therefore be suppressed.

Figure 5:
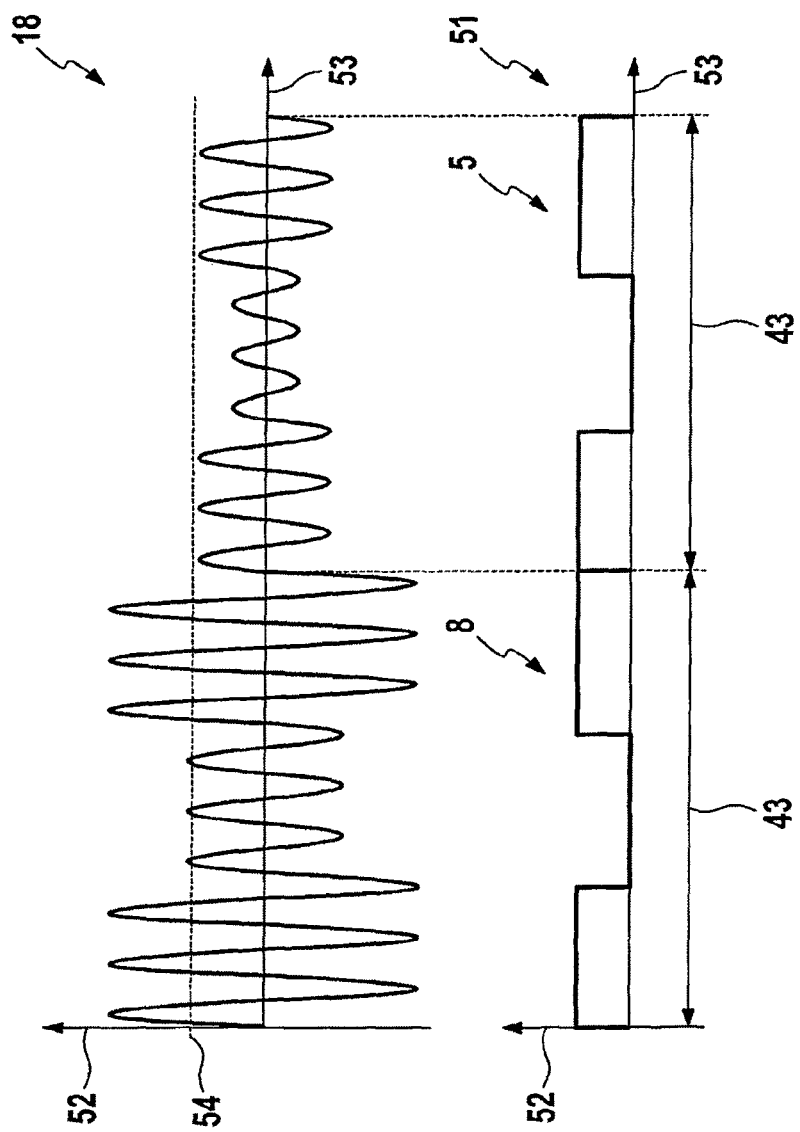
FIG. 5 shows a basic illustration of signals to be filtered that have been received from the vehicle ad hoc network from FIG. 3.

The predetermined filter condition that can be implemented in the second initial filter 48 is explained below with reference to FIGS. 5 and 6, which show an example of the car2X signal 18 and a signal 51 carrying the data packets 43 that belong to the car2X signal 18, each in a signal strength 52/time 53 diagram. In addition, it will be assumed by way of example that the road accident 10 is intended to be presented on the navigation system 13 and that the car2X signal 18 is used to transmit a car2X message 17, reporting the road accident 10, in a data packet 43.

The car2X signal 18 may be any carrier signal onto which the data packets 43 have been modulated in any manner. Since the car2X signal 18 transmits the data packets 43 from all nodes 3, 5, 8 involved in the car2X network 1, there are, besides the data packets 43 from the accident vehicle 8, also data packets 43 from nodes 3, 5, 8 that are further away from the vehicle 3, such as one from the two sets of traffic lights 5. As can be seen from FIG. 5, such a node 5 that is further away can be identified from the fact that its data packets 43 are transmitted at a signal strength 52 that is much lower than the signal strength 52 of the data packets 43 from the accident vehicle 8. At this point, the initial filtering can be used to effect and it is possible for just the data packets 43 that have been transmitted by car2X signal 18 at a certain minimum signal strength 54 to be filtered out of the car2X signal 18.

This filtering is implemented in the second initial filter 48, and the second initial filter 48 should then know the signal strength 52 of the car2X signal 18 for each data packet 43. In this case, the minimum signal strength 54 could be chosen such that the number of data packets 43 that result from the filtered car2X signal 49 from the first initial filter 47 is matched to the available computation power for unpacking and processing the filtered data packets 50. In this context, it would be possible, by way of example, as shown in FIG. 6, for car2X messages 17 coming from the set of traffic lights 5 to be filtered out because said set of traffic lights is still too far away in order to be regarded as relevant for the purposes of the available computation resources.

The filtering of the car2X signal 18 and/or of the data packets 43 on the basis of the minimum signal strength 54 has the effect that nodes 5, 8 in car2X network 1 that are too far away to be safety-critical for the vehicle 3 are disregarded by the aforementioned data processing device in the case of excessive computation load for processing all the data packets 43 arriving in the car2X signal 18, because in this case there are certainly nodes 5, 8 in the car2X network 1 that are situated closer to the vehicle 3, and/or events 10 that are more important from road safety perspectives, since otherwise the high computation load would not arise. Stated clearly, the minimum signal strength 54 attempts to set reception radii around the vehicle 3 in the case of the excessive computation load, outside which reception radii the data packets 43 from the nodes 5, 8 of the car2X network 1 are ignored. It then no longer matters what these nodes 5, 8 have actually sent in terms of content.

The minimum signal strength 54 and hence the reception radii should not be set statically, however, because then, when there are sufficient signal processing resources for processing data packets 43 in the car2X signal 18, data packets 43 are unnecessarily ignored or eliminated.

Therefore, the minimum signal strength 54 should be chosen variably, which could be done in the second initial filter 48 on the basis of a control system, which is shown in FIGS. 7a and 7b.

When the car2X messages 17 are extracted from the data packets 43 of the filtered car2X signal 49 in the message extraction device 46 using an appropriate signal processing device 56, they can be stored in a queue 57 if they cannot be processed immediately by the superordinate signal processing devices, such as the navigation system 13 and/or the actuating device 33. As an indicator of whether or not the total computation power is sufficient, it is possible to use the actual level of filling 58 of the queue 57 in this case. If the actual level of filling 58 exceeds a particular setpoint level of filling 59 from which the computation power of the overall system is no longer sufficient to process all filtered data packets 50, the minimum signal strength 54 can be raised as appropriate in the second initial filter 48 by a controller 60 on the basis of a control difference 61 between the setpoint level of filling 59 and the actual level of filling 58 in order to decrease the number of filtered data packets 50 that arrive at the message extraction device 46 using an appropriate filter element 62, as shown in FIGS. 5 and 6, that is dependent on the minimum signal strength 54.

As an alternative or in addition to the control loop described above, the second initial filter 48 can filter the data packets 43 as shown in FIGS. 8a and 8b too.

First of all, normalisation can be performed for a number of data packets, which have been provided with the reference symbols 43.1 to 43.7 in FIGS. 8a and 8b, in an observation period 63. To this end, the signal strength 52 of each data packet 43.1 to 43.7 can according to any normalisation rule, such as:

$$A_{norm}(A)=(A-A_{min})/(A_{max}-A_{min}).$$

In this case, A represents the signal strength 52, $A_{norm}$ represents the normalised signal strength 64, $A_{min}$ represents the minimum signal strength 65 in the observation period 63 and $A_{max}$ represents the maximum signal strength 66 in the observation period 63. By way of example, an alternative normalisation rule would be $$A_{norm}(A)=A/(A_{max}-A_{min}).$$

The data packets 43.1 to 43.7 that have thus had their signal strength 52 normalised can then be sorted as shown in FIG. 8b and eliminated in the event of a shortfall below the further minimum signal strength 65 for the second initial filter 48.

The normalisation can be used to ensure that data packets 43 are handled in standardised fashion in different reception scenarios, for example in cities or on open terrain.

The second initial filter 48 can be extended by further filter elements, which are not shown. One possibility would be for reception sectors to be defined on the vehicle 3 and for the car2X antenna 19 to be embodied in directional form. It would then be possible for a car2X antenna 19 to be directed into each of these defined reception sectors, as a result of which it would be possible to ascertain the reception direction of the car2X signal 18 and/or of the data packets 43. In this case, it is not absolutely necessary for a dedicated transceiver 16 to be provided for each directed car2X antenna 19. By way of example, the reception sectors could be defined in front of the vehicle 3, behind the vehicle 3, to the left of the vehicle 3 and to the right of the vehicle 3 as seen from the direction of travel 7 of the vehicle 3. The assessment of the data packets 43 on the basis of these reception sectors can be taken as a basis for better assessment of situations such as junctions on the road 2. It can normally be assumed that car2X signals 18 that are received from in front of or from behind the vehicle 3 as seen in the direction of travel 7 have a higher signal level 52 than car2X signals 18 that are received from the left or from the right of the vehicle 3. This could then be taken into account when determining the normalised signal level 64, since car2X signals 18 that frequently transmit data packets 43 and come from the reception sectors to the left and right of the vehicle 3, e.g. shortly before a collision at a junction on the road 2, are dangerous. When the signal level 52 is normalised to the normalised signal level 64, it is also possible to take account of the probable driving manoeuver of the vehicle 3, for example, since if the vehicle turns e.g. left then car2X signals 18 coming from the left are more important than when the vehicle 3 is reversing. Alternatively, the reception sectors could also be taken into account for the purposes of weighting rather than for the purposes of normalisation, however.

When the received data packets 43 are assessed on the basis of the reception direction, the directional characteristic of the relevant car2X antenna 19 for the respective reception direction could likewise be also taken into account in the normalisation or weighting of the signal level 52. This directional characteristic could be measured, for example, and is in most cases already required for determining the reception direction anyway. Hence, differences in the signal level 52 of multiple received data packets 43 that arise solely from the directional characteristic of the car2X antennas 19 can be subtracted for the further processing or assessment.

In addition, even in situations in which the number of data packets 43 that actually need to be processed exceeds the available computation capacity, it would be possible to reduce the number of data packets 43 that need to be processed from one and the same sender, that is to say from the accident vehicle 8, for example, by specifically omitting and hence rejecting data packets 43 of the same type that indicate the accident 10, for example.

Figure 9:
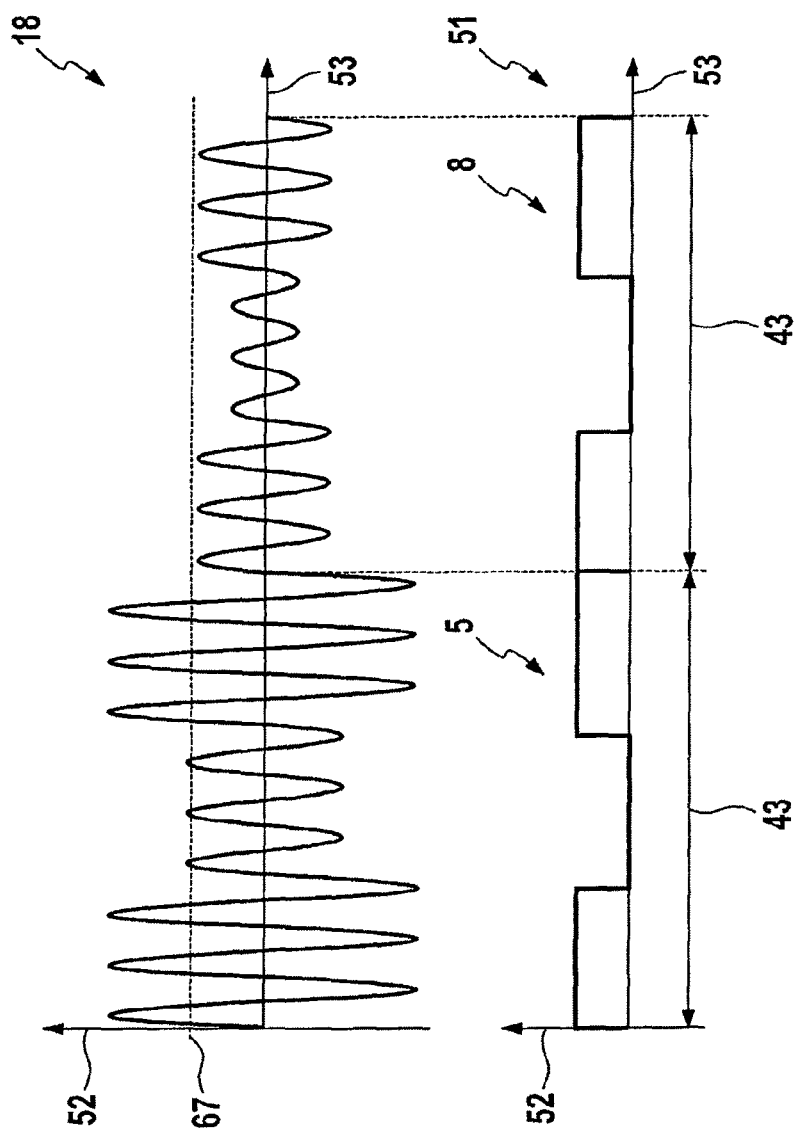
FIG. 9 shows a basic illustration of signals to be filtered that have been received from the vehicle ad hoc network from FIG. 3.

In the third initial filter 48' in the other of the two aforementioned processing paths, a further predetermined filter condition is used that should be independent of the filter condition in the second initial filter 48. The predetermined filter condition for the third initial filter 48' is explained below with reference to FIGS. 9 and 10, which show the car2X signal 18 and the signal 51 carrying the data packets 43 that belong to the car2X signal 18, each in a signal strength 52/time 53 diagram. In this case, FIG. 9 essentially corresponds to FIG. 5.

In contrast to the second initial filter 48, the third initial filter 48' is intended to filter the data packets 43 from the initially filtered car2X signal 49 on the basis of a maximum signal strength 67, and in this case too the third initial filter 48' ought to know the signal strength 52 of the car2X signal 18 for each data packet 43. In this case, the maximum signal strength 67 in FIGS. 9 and 10 should be chosen such that the number of data packets filtered from the data packets 43 arising from the filtered car2X signal 49 is such that the filtered data packets 50' to be forwarded that are output to the message generation device 39 can be forwarded to other nodes in the car2X network 1 using available computation power and/or an available channel capacity.

Figure 10:
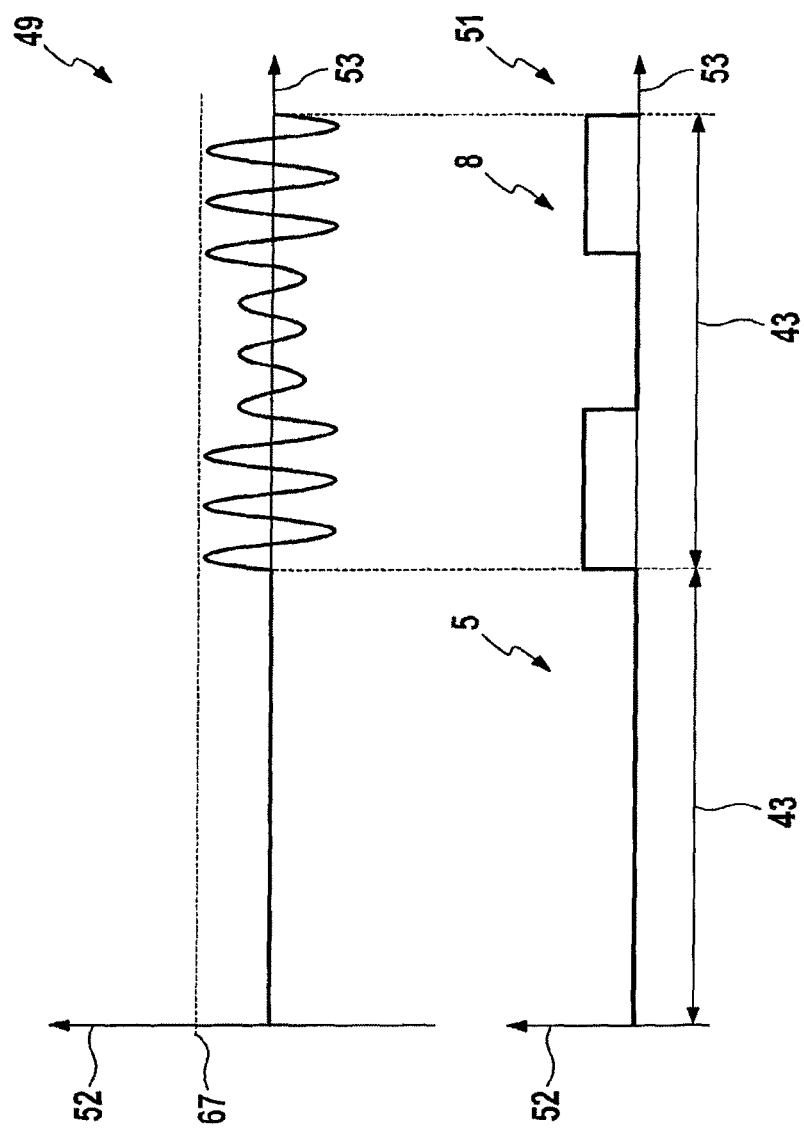
FIG. 10 shows a basic illustration of filtered signals that have been received from the vehicle ad hoc network from FIG. 3, FIGS. 11a and 11b show a basic illustration of data packets that have been filtered from a signal received via the vehicle ad hoc network from FIG. 3, FIGS. 12a and 12b show a basic illustration of a transmission signal in the car2X network 1 from FIG. 3 in two different channel utilisation states.

The filtering of the car2X signal 18 and/or of the data packets 43 on the basis of the maximum signal strength 67 has the effect that the vehicle 3 and hence the forwarding node ignores received data packets 43 from nodes 5, 8 in the car2X network 1 that are situated too close thereto, since in this case the vehicle 3, as a forwarding node, cannot reach significantly more receivers than the node 5, 8 that originally transmits the data packet. If, by way of example, in contrast to what is shown in FIG. 1, one of the sets of traffic lights 5 is situated closer to the vehicle 3 that is not involved in the accident 10 than the accident vehicle 8, then the vehicle 3 that is not involved in the accident could, as shown in FIG. 10, filter out all data packets 43 from the set of traffic lights 5 for forwarding because it cannot significantly increase the transmission area of the set of traffic lights 5.

In this case, the maximum signal strength 67 could be controlled in a similar manner to the minimum signal strength 54 in the second initial filter 48 or adjusted otherwise on the basis of the load state of the downstream processing device or even on the basis of the utilisation level of the transmission channel of the car2X network 1.

One way of taking the utilisation level of the transmission channel of the car2X network 1 into account when adjusting the maximum signal strength 67 would be to adjust the maximum field strength 54 on the basis of a statistical condition. The statistical condition can be defined over a predetermined period 68, which is indicated in FIG. 11a, in which a determined number of received data packets 43.1 to 43.7 is considered. It goes without saying that the definition of the statistical condition could also involve consideration of the filtered data packets 43 downstream of the first initial filter 47.

The statistical condition for the maximum field strength 67 can now be defined in the form of a statistical quantile, for the purposes of which the maximum field strength 67 is chosen such that, of the considered data packets 41.1 to 43.7, only a determined shortfall component of these considered data packets 43.1 to 43.7 is taken into account downstream of the filtering in the third initial filter 48'. To this end, the quantile can be defined as a percentile 69, for example, for the purposes of which only a determined percentage of data packets 43.1 to 43.7 having the lowest signal strengths 52 continues to be used downstream of the third initial filtering 48'. To illustrate this approach, the data packets 43.1 to 43.7 considered in the predetermined period 68 are shown in FIG. 11a in order of reception and in FIG. 11b in a manner sorted according to their signal strengths 52 at which the car2X signal 18 has been received.

Alternatively or additionally, the individual data packets 43 can be filtered and eliminated in the third initial filter 48' on the basis of their priority too. This initial filtering will be illustrated in more detail below with reference to FIGS. 12a and 12b, which show the channel load of the car2X network 1 on the basis of an exemplary car2X signal 18, as can be tapped off with the car2X antenna 19, in two different states of the car2X network 1.

In this regard, it should first of all be mentioned that car2X messages 17, 17' should be packed and sent at the sender end fundamentally on the basis of the "first in first out" principle, which is called FIFO. This can be accomplished by using queues 70, for example, in which the data packet generation device 42 stores the data packets 43 produced from the car2X messages 17, 17' and the modulation device 44 modulates the data packets 43 onto the car2X signal 18 on the basis of their order in which they have been placed into the queue 57.

If, as FIG. 12a shows, there are only a few free transmission slots 71 in the car2X signal 18, then it takes a correspondingly long time before the data packets 43 in the queue 70 have been handled and sent. The procedure is correspondingly faster if, as shown in FIG. 12b, there are correspondingly more free transmission slots 71. The higher the channel load in the car2X network 1, the fewer free transmission slots 71 there are available. Therefore, for a correspondingly high channel load, only data packets 43 having a correspondingly high priority should be put into the queue 70.

Although the elimination could be performed by message generation device 42, under the aforementioned technical constraints of having the filtering take place as early as possible, it should actually be the third initial filter 48' that decides whether a received data packet 43 having a car2X message 17 that potentially needs to be forwarded is actually unpacked and transferred to the message generation device 42. If a received data packet 43 itself already reveals that it carries a low-priority car2X message 17, then it should actually be eliminated in the third initial filter 48' if there are few free transmission slots 71 and hence if there is a high channel load.

Figure 13:
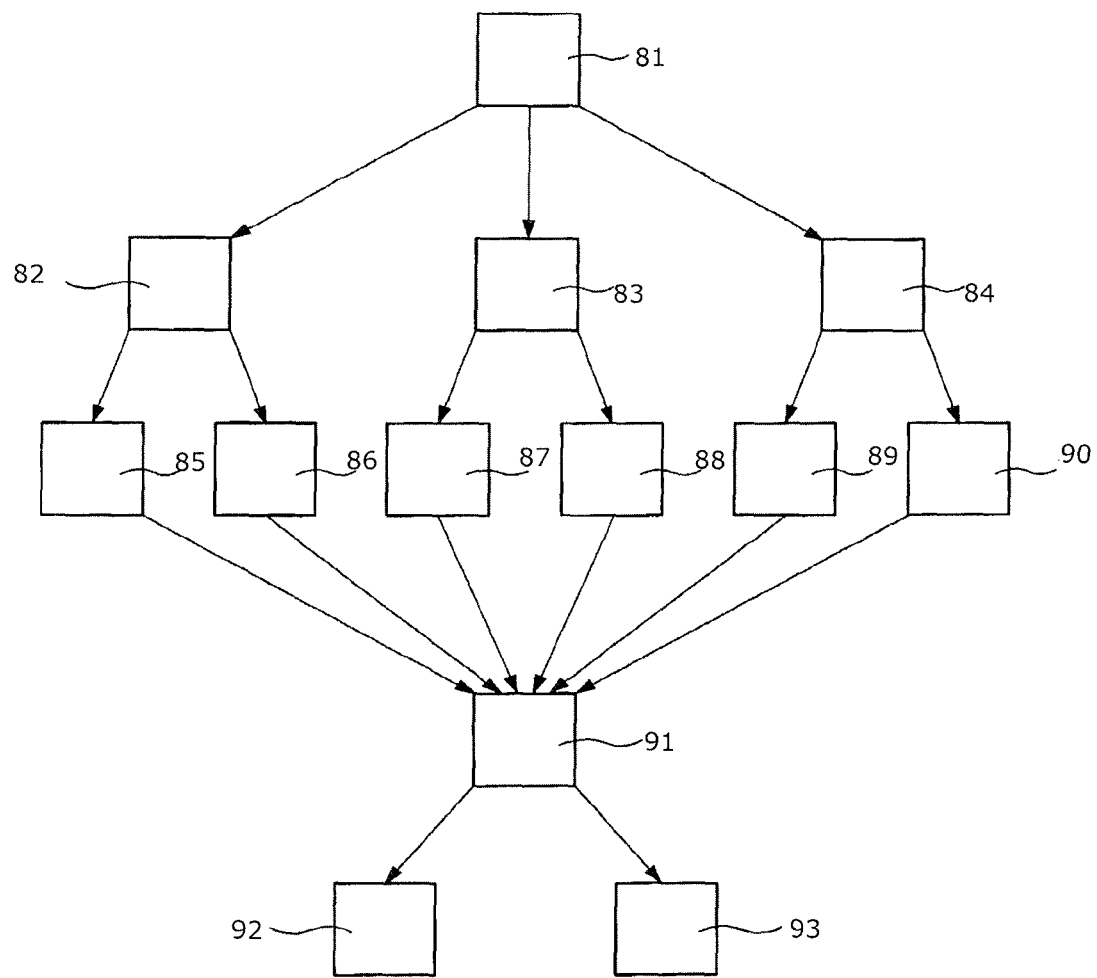
FIG. 13 shows an example of a possible sequence for the method according to an aspect of the invention in the form of a flowchart.

FIG. 13 shows an example of a possible sequence for the method according to an aspect of the invention in the form of a flowchart. In method step 81, a vehicle-to-X communication system of a motor vehicle receives a vehicle-to-X message. In step 82, the reception field strength at the antenna of the vehicle-to-X communication system is then determined. If this is sufficiently high and exceeds a threshold value, a decision is made in step 85 not to re-send or forward the vehicle-to-X message. The vehicle-to-X message is thus marked by means of a flag such that the high reception field strength means that no georouting is intended to take place. If step 86 establishes that the reception field strength of the vehicle-to-X message is only low and falls short of a threshold value, then this vehicle-to-X message is forwarded or re-sent. The vehicle-to-X message is thus marked by means of a flag such that the low reception field strength means that georouting is intended to take place. In step 83, a check is then performed to determine whether the receiver vehicle for the vehicle-to-X message is situated in the destination area for the vehicle-to-X message. If the receiver vehicle is situated in the destination area, then the vehicle-to-X message is marked by means of an appropriate flag in step 87 such that it is intended to be forwarded to the communication-based applications of the receiver vehicle and processed by said applications on account of the destination area. If the receiver vehicle is not situated in the destination area, however, then the vehicle-to-X message is marked by means of an appropriate flag in step 88 such that it is not intended to be forwarded to the communication-based applications of the receiver vehicle on account of the destination area. In method step 84, a check is performed to determine whether the received vehicle-to-X message is relevant to the receiver vehicle. If this is the case, the vehicle-to-X message is marked by means of an appropriate flag in step 89 such that it is intended to be forwarded to the appropriate communication-based applications of the receiver vehicle. If this is not the case, however, the vehicle-to-X message is marked by means of an appropriate flag in step 90 such that it is not intended to be forwarded to the appropriate communication-based applications of the receiver vehicle. In step 91, the flags that have been used to mark the vehicle-to-X message are then checked. If there is no flag present stating that the vehicle-to-X message is not intended to be forwarded to the communication-based applications, then said vehicle-to-X message is forwarded to said applications in step 92 and processed by said applications. If there is likewise no flag present stating that the vehicle-to-X message is not intended to be forwarded or re-sent, then said vehicle-to-X message is supplied to the georouting process in step 93 and forwarded or re-sent by said georouting process.

The further aspect of the invention can also be described on the basis of the following principles:

1. A method for reducing the computation load on a vehicle-to-X communication system,
wherein the vehicle-to-X communication system is used to receive and/or send a multiplicity of vehicle-to-X messages and
wherein the received vehicle-to-X messages call for forwarding by means of re-sending and/or processing by the vehicle-to-X communication system,
characterized
in that the forwarding and/or the processing take place on the basis of a reception field strength and/or a position of a receiver vehicle and/or a relevance of the vehicle-to-X messages.

2. The method according to principle 1,
characterized
in that needs for forwarding and/or processing that arise from the reception field strength and/or position and/or relevance are determined separately from one another.

3. The method according to principle 2,
characterized
in that the vehicle-to-X messages are marked using flags that indicate the needs.

4. The method according to principle 2,
characterized
in that the vehicle-to-X messages are associated with separate task communication channels that indicate the needs.

5. The method according to at least one of principles 1 to 4,
characterized in that the need for forwarding on the basis of the reception field strength is dependent on whether the reception field strength exceeds a fixed or alterable threshold value, the need for forwarding on the basis of the reception field strength not existing if the reception field strength exceeds the threshold value.

6. The method according to at least one of principles 1 to 5,
characterized
in that the need for forwarding on the basis of the position of a receiver vehicle is dependent on whether the receiver vehicle is situated in a destination area for the vehicle-to-X message, the need for forwarding on the basis of the position not existing if the receiver vehicle is situated in the destination area.

7. The method according to at least one of principles 1 to 6,
characterized
in that the need for forwarding on the basis of the relevance is dependent on whether the vehicle-to-X message is flagged as relevant, the need for forwarding on the basis of the position not existing if the vehicle-to-X message has not been flagged as relevant.

8. The method according to at least one of principles 1 to 7,
characterized
in that the need for processing on the basis of the position of a receiver vehicle is dependent on whether the receiver vehicle is situated in a destination area for the vehicle-to-X message, the need for processing on the basis of the position not existing if the receiver vehicle is situated outside the destination area.

9. The method according to at least one of principles 1 to 8,
characterized
in that the need for processing on the basis of the relevance is dependent on whether the vehicle-to-X message is flagged as relevant, the need for processing on the basis of the position not existing if the vehicle-to-X message has not been flagged as relevant.

10. The method according to principle 9,
characterized
in that the processing takes place by dint of communication-based application and/or assistance systems of the receiver vehicle.

11. The method according to at least one of principles 1 to 10,
characterized
in that vehicle-to-X messages flagged as relevant are forwarded in each case and/or processed in each case.

The invention claimed is:

1. A method for receiving a data packet by a receiving vehicle, containing at least position data, in a transmission signal via a vehicle ad hoc network, the method comprising:
filtering, by a first filter within a car-to-x transceiver of the receiving, vehicle, the received data packet on the basis of a first filter condition indicating that the received data packets are relevant to the receiving vehicle and outputting the filtered data packet to a processing device within the receiving vehicle for processing the filtered data packet, and
filtering, by a second, filter within the car-to-x transceiver of the receiving vehicle, the received data packet on the basis of a second filter condition indicating a predetermined physical distance such that:
a forwarding device within the car-to-x transceiver of the receiving vehicle forwards the filtered data packet to a further subscriber of the vehicle ad hoc network, in response to the receiving vehicle determining that the received data packets are transmitted from a subscriber vehicle located at least the predetermined physical distance away from the receiving vehicle, and the forwarding device within the vehicle does not forward the filtered data packet to the further subscriber of the vehicle ad hoc network, in response to the receiving vehicle determining that the received data packets are transmitted from a subscriber vehicle located less than the predetermined physical distance away from the receiving vehicle.

2. The method as claimed in claim 1, wherein the filtering on the basis of the first filter condition and the filtering on the basis of the second filter condition are performed independently of one another.

3. The method as claimed in claim 1, wherein the first filter condition comprises a minimum signal strength for a signal strength of the transmission signal.

4. The method as claimed in claim 3, wherein the filtering of the received data packet comprises rejection of the received data packet if the signal strength of the received data packet falls below the minimum signal strength.

5. The method as claimed in claim 1, wherein the first filter condition is dependent on operation of the processing device.

6. The method as claimed in claim 5, wherein the filtering of the received data packet on the basis of a first filter condition comprises rejection of the received data packet if a message packed in the data packet is irrelevant to the operation of the processing device.

7. The method as claimed in claim 1, wherein the second filter condition comprises a maximum field strength for a signal strength of the transmission signal.

8. The method as claimed in claim 7, wherein the filtering of the received data packet comprises rejection of the received data packet if the signal strength of the received data packet is above the maximum field strength.

9. An apparatus for receiving a data packet by a receiving vehicle, the data packet containing at least position data, in a transmission signal via a vehicle ad hoc network, the apparatus comprising:

a first filter within the receiving vehicle, the first filter filtering the received data packet on the basis of a first filter condition indicating that the received data packets are relevant to the receiving vehicle and outputting the filtered data packet to a processing device within the receiving vehicle for processing the filtered data packet, and a second filter within the receiving vehicle, the second filter filtering the received data packet on the basis of a second filter condition indicating a predetermined distance such that:

a forwarding device within the vehicle forwards the filtered data packet to a further subscriber of the vehicle ad hoc network, in response to the receiving vehicle determining that the received data packets are transmitted from a subscriber vehicle located at least the predetermined physical distance away from the receiving vehicle, and the forwarding device within the vehicle does not forward the filtered data packet to the further subscriber of the vehicle ad hoc network, in response to the receiving vehicle determining that the received data packets are transmitted from a subscriber vehicle located less than the predetermined physical distance away from the receiving vehicle.

10. A transceiver for a vehicle for receiving data packets, which are sent in a transmission signal, in a vehicle ad hoc network, comprising:

an antenna for receiving the transmission signal, and an apparatus as claimed in claim 9.

11. The method as claimed in claim 2, wherein the first filter condition comprises a minimum signal strength for a signal strength of the transmission signal.

* * * * *